United States Patent [19]

Ichikawa et al.

[11] Patent Number: 5,745,444
[45] Date of Patent: Apr. 28, 1998

[54] METHOD OF CONTROLLING RECORDING INFORMATION ON AN OPTICAL DISK USING REPLACEMENT CONTROL INFORMATION

[75] Inventors: Norimoto Ichikawa; Kenji Tokumitsu, both of Odawara; Makoto Seita, Hadano, all of Japan

[73] Assignees: Hitachi, Ltd., Tokyo; Hitachi Computer Engineering Co., Ltd., Kanagawa-ken, both of Japan

[21] Appl. No.: 574,131

[22] Filed: Dec. 18, 1995

[30] Foreign Application Priority Data

Dec. 19, 1994 [JP] Japan ..................... 6-314454

[51] Int. Cl.⁶ ................. G11B 17/22; G11B 3/90
[52] U.S. Cl. ........................... 369/32; 369/58
[58] Field of Search ................. 369/30, 32, 33, 369/47, 48, 54, 58, 53; 360/78.04, 78.08, 78.14

[56] References Cited

U.S. PATENT DOCUMENTS 5,303,219  4/1994  Kulakowski et al. ........... 369/58 X
5,453,968  9/1995  Veldhuis et al. ............... 369/48 X

FOREIGN PATENT DOCUMENTS

5-6891  1/1988  Japan .

*Primary Examiner*—P. W. Huber
*Attorney, Agent, or Firm*—Fay,Sharpe,Beall,Fagan,Minnich & McKee

[57] ABSTRACT

Information is recorded on a rewritable optical disk apparatus in accordance with the second generation 5 inch rewritable-type optical disks standards that provide for reusing once-defective user blocks. Such disks have a user data recording region, a replacement recording region and a replacement control information recording region in which a table of information linking defective blocks in the user data recording region with replacement blocks in the replacement recording region is stored. Continuity of the distribution of the replacement recording blocks is maintained by treatment of replacement blocks that become unnecessary. Unnecessary replacement blocks are ones that are not used for storing data because of the subsequent successful recording of data in once defective user blocks to which the replacement blocks were previously linked. Such unnecessary replacement blocks are treated as being defective if a following assigned replacement block exists in the replacement block recording region and they are used in links with other defective user blocks and assigned replacement blocks. In addition to maintaining continuous distribution of the replacement blocks as required by the second generation standard, fewer replacement blocks are required to be used.

16 Claims, 11 Drawing Sheets

FIG. 11B

METHOD OF CONTROLLING RECORDING INFORMATION ON AN OPTICAL DISK USING REPLACEMENT CONTROL INFORMATION

FIELD OF THE INVENTION

The present invention relates to a method of controlling records of information in an optical disk apparatus and in particular to a method of controlling records of information in a rewritable optical disk system.

BACKGROUND OF THE INVENTION

In the prior art, when a defective block is detected in the recording of information, on an optical disk apparatus the information has been recorded in a replacement block in a replacement recording region of the disk. Since high-density recording is practiced with optical disks, a temporary defect sometimes occurs in the recording due to dust or the like adhering to the optical disk or by analogous causes.

In the optical disk apparatus disclosed in Japanese Patent Publication No. 5-6891 the number of replacement blocks in use within the replacement recording region is reduced by, in the updating of data the updating of data also for the user block which was once judged defective. Then, if data is updated normally in the once-defective user block, the once-defective user block is treated as a normal user block from that time on. Thus, the defective user block which became defective by a temporary cause is reused and the link information linking the defective user block with the replacement block assigned to it is deleted from the replacement information recording region.

SUMMARY OF THE INVENTION

In the above described prior art, when the updating of data is performed normally for once-defective user blocks and the corresponding link information linking the once-defective user blocks with replacement blocks assigned thereto is deleted, it occurs that there are left replacement blocks not in use. That is, replacement blocks are left that are not continuously distributed in the replacement recording region and such replacement blocks cannot be reused.

In the ISO/IEC10089 standard of the medium of the first generation five-inch rewritable type optical disk, it is provided that there should only be link information linking defective user blocks with replacement blocks in the replacement control information recording region. Therefore, no special problem arises even if replacement blocks not in use are left uncontinuously distributed in the replacement recording region.

However, according to the standards of the second generation five-inch rewritable type optical disk (for example, STANDARD ECMA-184, STANDARD ECMA-195), it is provided that another replacement block should be assigned to a replacement block which was judged defective at the time of recording; and that the link information linking the defective replacement blocks with the replacement blocks for the defective replacement blocks should be recorded in the replacement control information recording region. Since it is further stipulated that the replacement recording region should be used continuously, in the reusing of defective blocks in an optical disk according to the standards, the conventional method in which replacement blocks not in use are uncontinuously distributed in the replacement recording region cannot be used.

An object of the present invention is to provide, for an optical disk in accordance with the standard for the second generation five-inch rewritable type optical disk, a method in which defective user blocks and defective replacement blocks can be reused while the replacement recording region is used continuously. In this way, replacement blocks in use within the replacement recording region can be prevented from continuing to increase in number.

At the time of data updating, data is updated also for the user block previously judged defective and, if data is updated normally in the once-defective user block, the link information linking the defective user block with the replacement block assigned to the same is deleted from the replacement control information recording region and the user block is reused as a normal block from that time on.

As a result, the replacement block (52) becomes unnecessary (URB) and it is treated as a defective replacement block when there is an assigned replacement block following it in the direction of recording. Then, another replacement block (assigned replacement block) recorded in the replacement control information recording region is assigned as the replacement block for the same, i.e. the replacement block treated as being defective. Further, the replacement block that is treated as being defective is assigned as the replacement block for the defective user block or the defective replacement block, for which the above assigned replacement block was assigned. Corresponding link information is stored in the replacement control information recording region.

Further, when a new defective user block is generated at the time of recording data and it becomes necessary to assign a replacement block thereto, if there are present, in the replacement recording region, defective replacement blocks 52 to which replacement blocks 53 are assigned, the data was to have been recorded in the defective user block is recorded in one of the defective replacement blocks. If it is recorded normally, the defective replacement block is assigned as the replacement block for the defective block and the same is used as a normal replacement block from that time on. At this time, the replacement block for the (once-defective) replacement block is assigned as the replacement block for the defective user block or the defective replacement block to which the reused replacement block was assigned.

At the time of data updating, data is also updated for the user block which was previously judged defective and to which a replacement block was assigned. If the data updating is performed normally, the user block is treated as a normal block from that time on. Further, the replacement block which was assigned to the user block is treated as a defective replacement block and incorporated into a link for another replacement block or made available as a replacement block for a defective user block or defective replacement block if the adjacent trailing replacement block is not assigned.

The defective replacement block can be assigned as a replacement block for a user block or a replacement block which may become defective later. In the event that the defective replacement block is reused, the defective user block or the defective replacement block to which the reused replacement block was assigned as the replacement block will use, as its replacement block, the block which was used as the replacement block for the reused replacement block.

Accordingly, the defective user blocks and the defective replacement blocks can be reused while the replacement region is used continuously.

DETAILED DESCRIPTION OF THE PREFERRED EMBODIMENTS

An embodiment of the invention will be described with reference to the accompanying drawings. FIG. 6 to FIG. 10 are drawings showing the structure of an optical disk apparatus according to a preferred embodiment of the invention.

Figure 6:
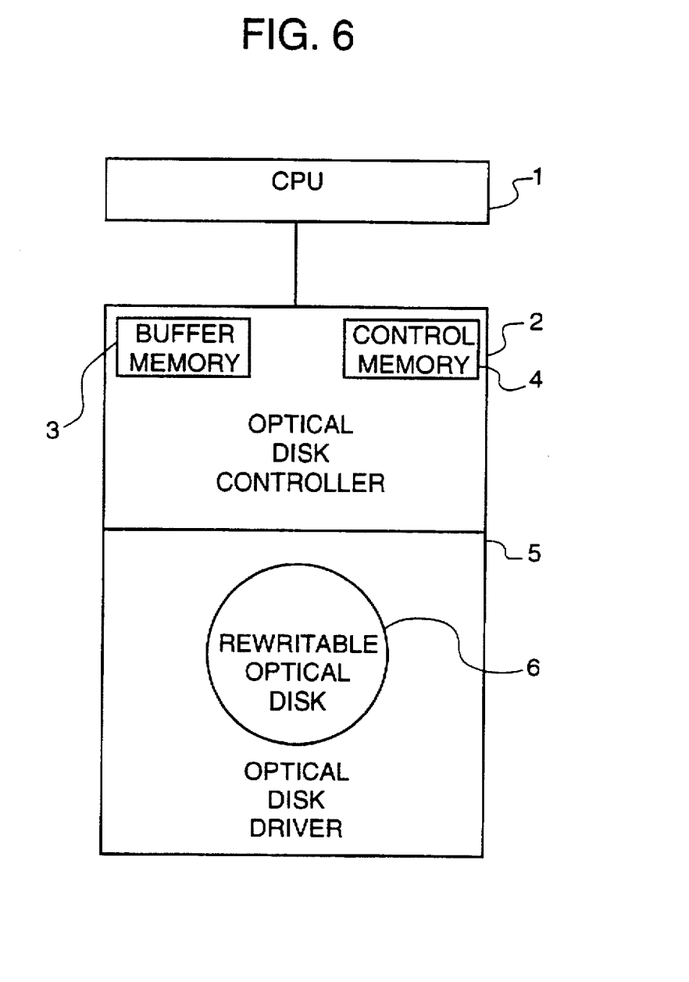
FIG. 6 is a structural drawing of the optical disk system to which the invention is applicable.

FIG. 6 shows an example of structure of an optical disk system according to a preferred embodiment of the invention. An optical disk driver 5 has an optical disk 6 mounted thereon and performs such operations as recording, reproducing, and erasing on the optical disk 6. A CPU (central processing unit) 1 is a host apparatus of the optical disk apparatus. The optical disk controller 2 receives instructions from the CPU 1 as its host apparatus and controls the optical disk driver 5. In this embodiment, the optical disk controller 2 has a buffer memory 3, which is a high-speed IC memory, and a control memory 4.

Figure 7:
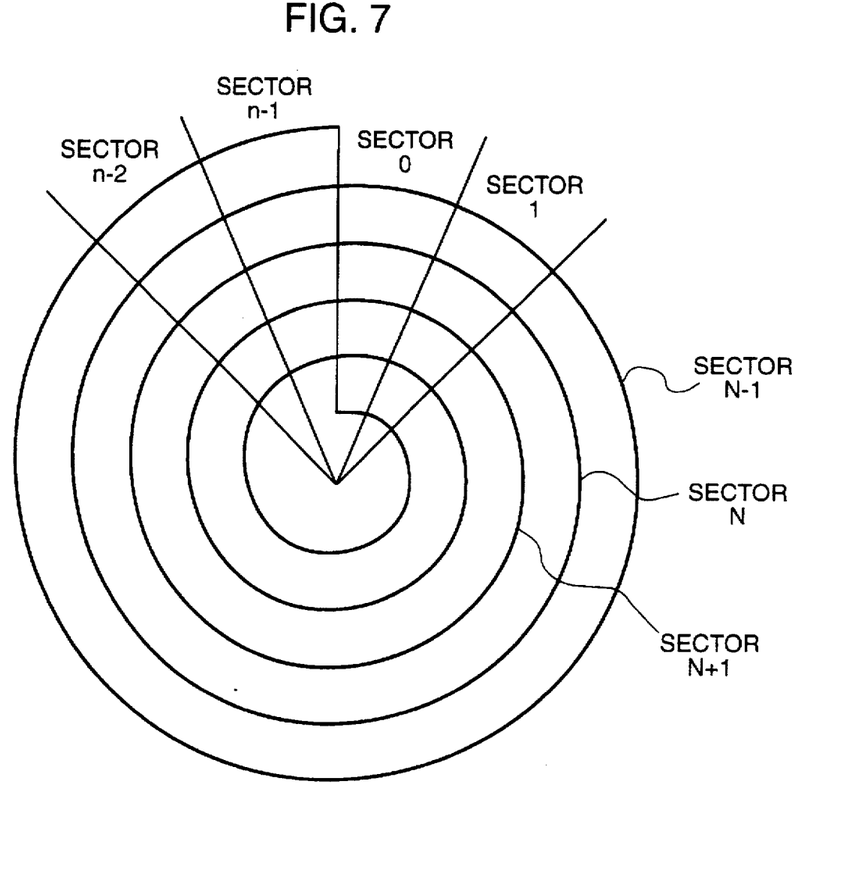
FIG. 7 is a drawing showing a track format on an optical disk.

FIG. 7 shows an example of a track format on the optical disk 6. Although the disk has a spiral track format, it may alternatively have a concentric-circular track format. The track is divided, more distinctly with the concentric-circular track than with the continuous spiral track, into a plurality of tracks, i.e., tracks N−1, N, N, N+1, . . . (sometimes, one track is formed of a predetermined number of blocks). Further, each track is divided into a plurality of sectors (sectors 0, 1, . . . , n−2, n−1) each thereof having its own specific address. Data recording on the optical disk 6 is performed for each block as a unit.

Figure 8:
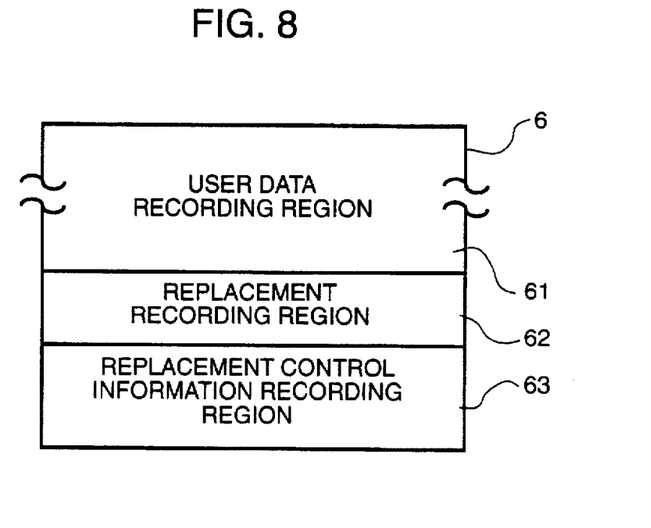
FIG. 8 is a drawing showing an example of allocation of the data area onto an optical disk.

FIG. 8 shows an example of the allocation of the data area onto the optical disk 6. Most of the data area is allocated to a user data recording region 61 and the rest is allocated to a replacement recording region 62 and a replacement control information recording region 63. The replacement recording region 62 is used for recording information that would have been recorded in a defective user block when data is recorded in the user data recording region 61. The related link information is stored in the replacement control information recording region 63.

Figure 9:
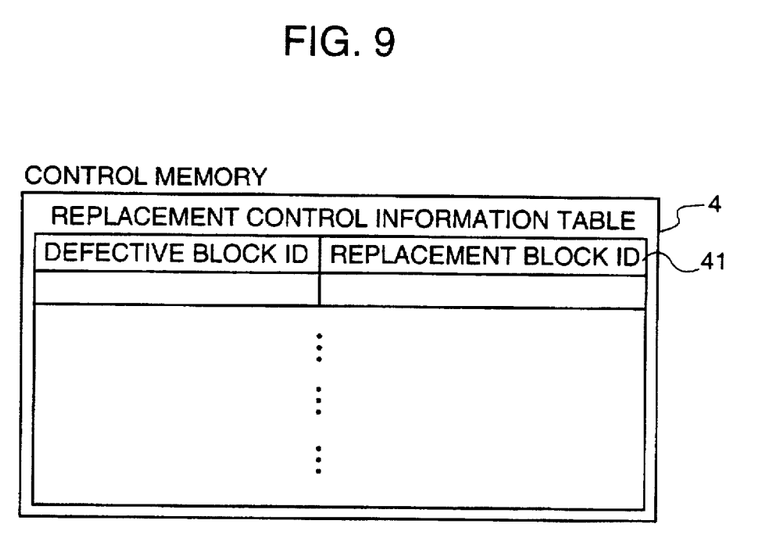
FIG. 9 is a drawing explanatory of a replacement control information table.

FIG. 9 shows control information in the replacement control information recording region 63 arranged in the form of a table on the control memory 4 within the optical disk controller 2. The replacement control information recording region 63 is automatically read by the optical disk controller 2 when the optical disk 6 is mounted on the optical disk driver 5, or when power is turned on with the optical disk 6 mounted on the optical disk driver 5, and the link information linking a defective user block within the user data recording region 61 with the replacement block within the replacement recording region 62 is stored in a replacement control information table 41 in the form of a table. When the replacement control information recording region 63 is updated, the replacement control information table 41, also, is updated.

Figure 10:
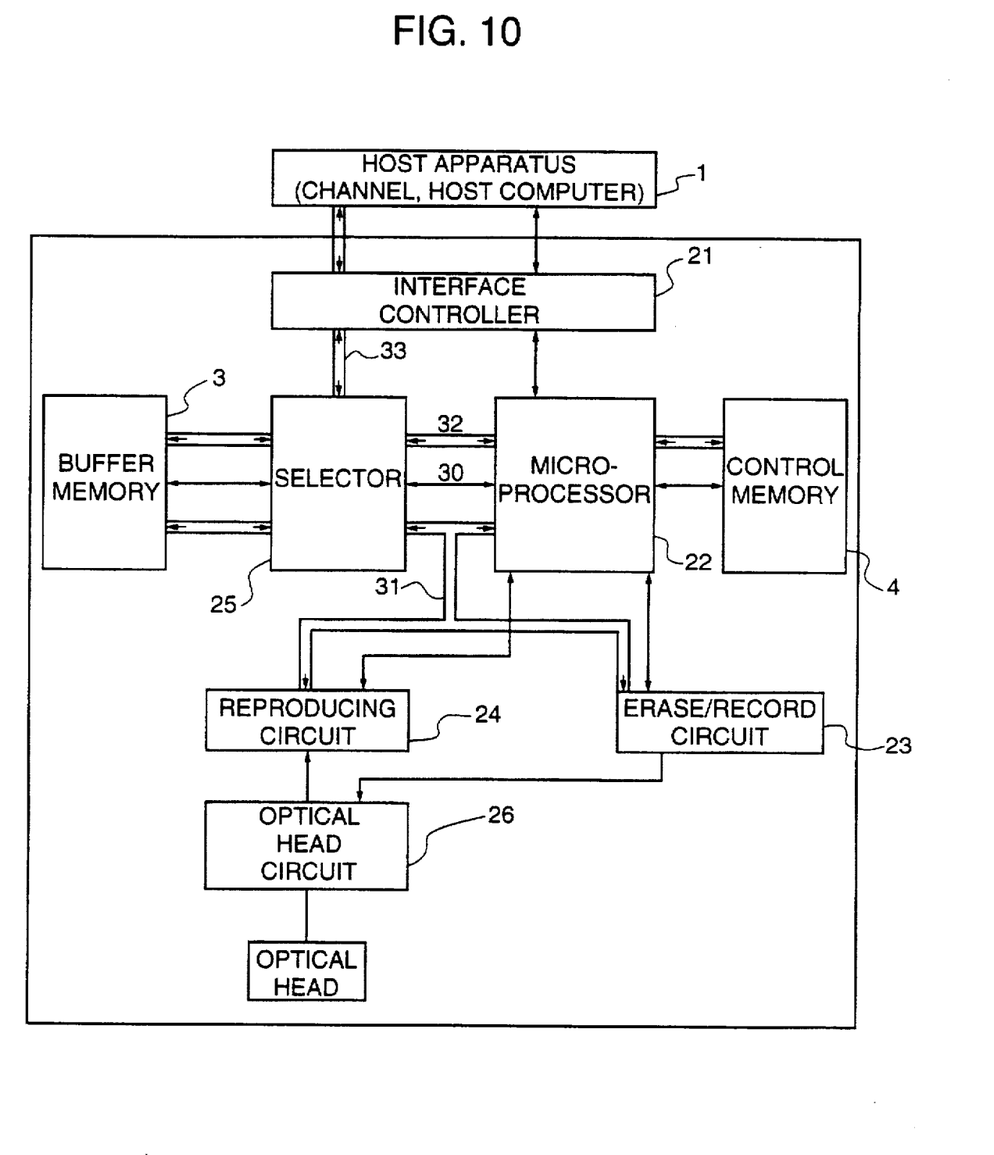
FIG. 10 is a block diagram of an optical disk apparatus to which the embodiment of the invention is applicable.

FIG. 10 is a block diagram showing a general structure of an optical disk apparatus as an example embodying the above described optical disk information record control system.

An interface controller 21 is provided for controlling signal exchange between the apparatus and the host apparatus 1 such as the channel device and the host computer. A microprocessor 22 operates in accordance with instructions from the host apparatus, and controls the performing of the above described recording and reproducing operations following predetermined procedures. Control memory 4 stores the microinstructions specifying the control operations of the microprocessor 22 and various sets of information. An erase/record circuit 23 is provided for modulating information taken out from the buffer memory 3 and outputting the information to an optical head circuit 26. A reproducing circuit is provided for demodulating an output signal from the optical head circuit 26 and for storing the demodulated signal into the buffer memory 3. A selector 25 selects input/output buses connected to the buffer memory 3, which, following the microinstructions 30 from the microprocessor 22, selectively connects an interface bus 33, a processor bus 32, and a record/reproduce circuit bus 31 to the buffer memory 3.

The preferred embodiment of the invention using the above described optical disk apparatus will be described with reference to FIGS. 1 to 5.

Figure 1A:
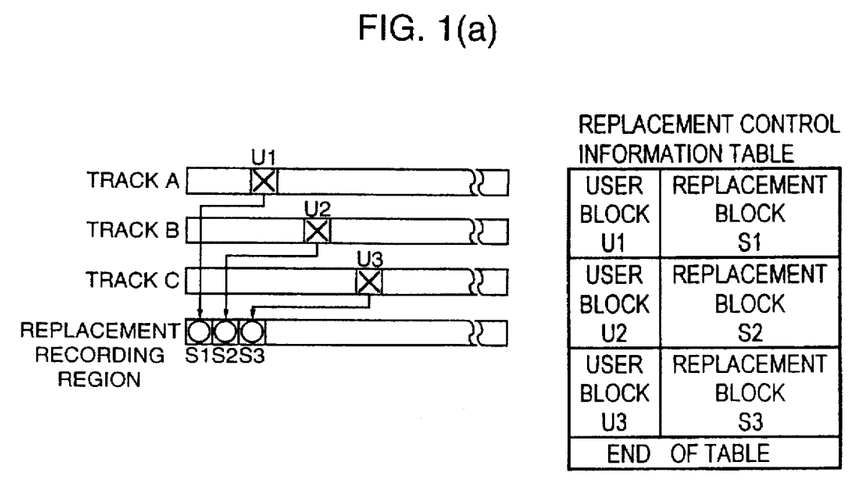
FIGS. 1a and 1b are drawings explanatory of the data recording method as an embodiment of the invention.

FIG. 1(a) shows that there are present defective user blocks U1, U2, and U3 on the tracks A, B, and C of the user data recording region and that replacement blocks S1, S2, and S3 in the replacement recording region are assigned to them as shown by the arrows, respectively. Note that the replacement blocks are adjacent one another in the replacement recording region and that S1 is at the head of the blocks, S2 follows S1 in the direction of recording, and that S3 is at the tail of the blocks following block S2, in this example. The blocks are typically 1 k or ½ k, according to conventional standards. The link information for the defective user blocks shown in FIG. 1(a) is U1-S1, U2-S2, and U3-S3 and the same is registered in the replacement control information table 41 and the replacement control information recording region 63.

Figure 1B:
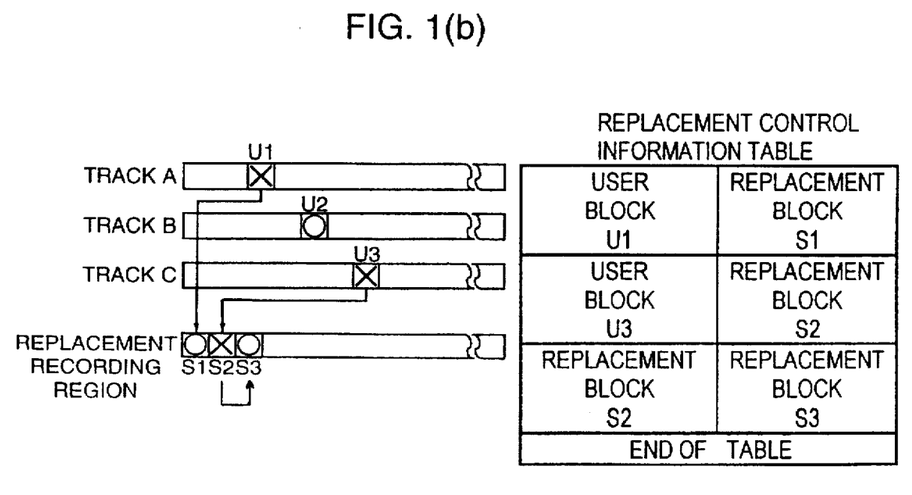

When data on the track B is updated in the described state of FIG. 1(a), data is also updated for U2, and if it is updated normally, the link information U2-S2 is deleted as shown in FIG. 1(b) and, then, the block S2 which has thus become unnecessary is inserted into the link information U3-S3 and a set of link information U3-S2-S3 (which indicates that, while information in the replacement control information table is U3-S2 and S2-S3, the data to be recorded in the defective user block U3 at the head of the link is recorded in the replacement block S3 at the tail of the link and the replacement block S2 in the middle is regarded as a defective replacement block and not used; the same will apply hereinafter) is generated and, thereby, the replacement control information table 41 and the replacement control information recording region 63 are updated.

Figure 2A:
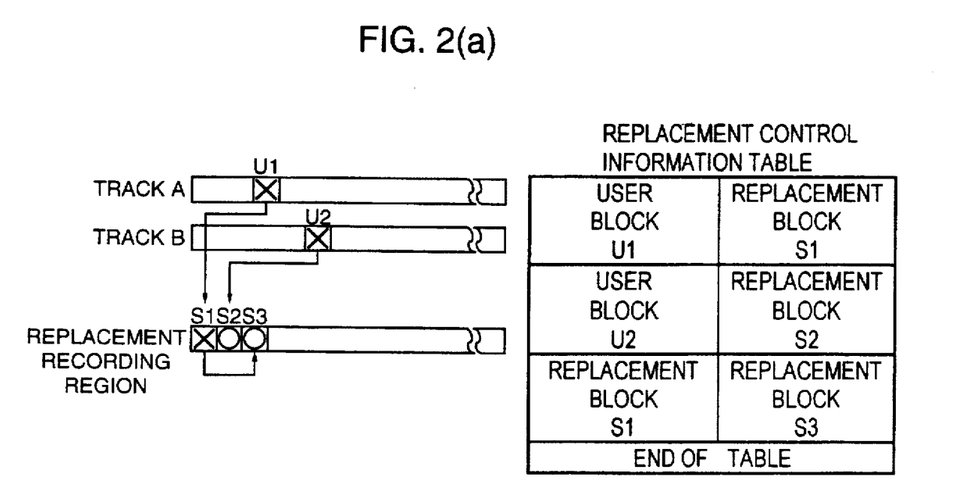
FIGS. 2a and 2b are drawings explanatory of the data recording method as the embodiment of the invention.
Figure 2B:
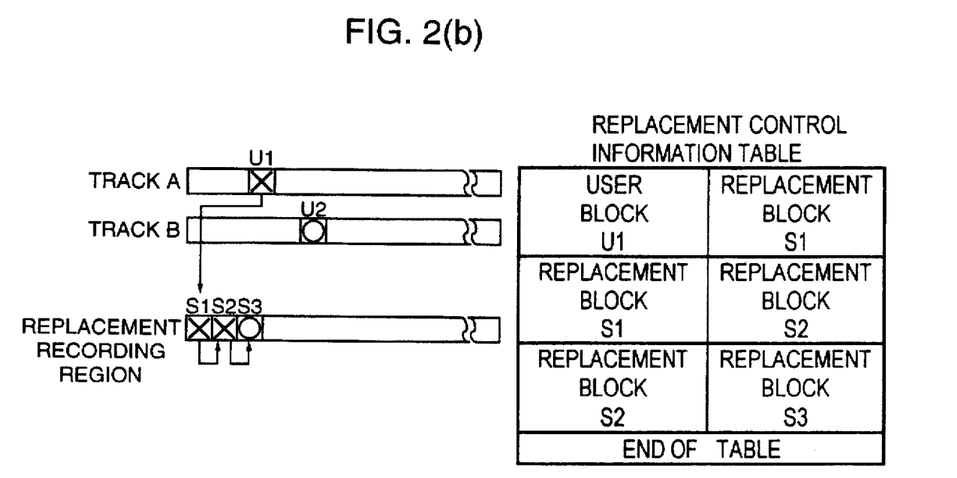

Similarly, FIG. 2(a) shows that there is link information U1-S1-S3 and U2-S2 and S1 is a defective replacement block. When data is updated on the track B and if data is updated normally also for U2, the link information U2-S2 is deleted as shown in FIG. 2(b). The block S2 which has thus become unnecessary is inserted into the link information U1-S1-S3 and link information U1-S1-S2-S3 is generated and, thereby, the replacement control information table 41 and the replacement control information recording region 63 are updated.

Figure 3A:
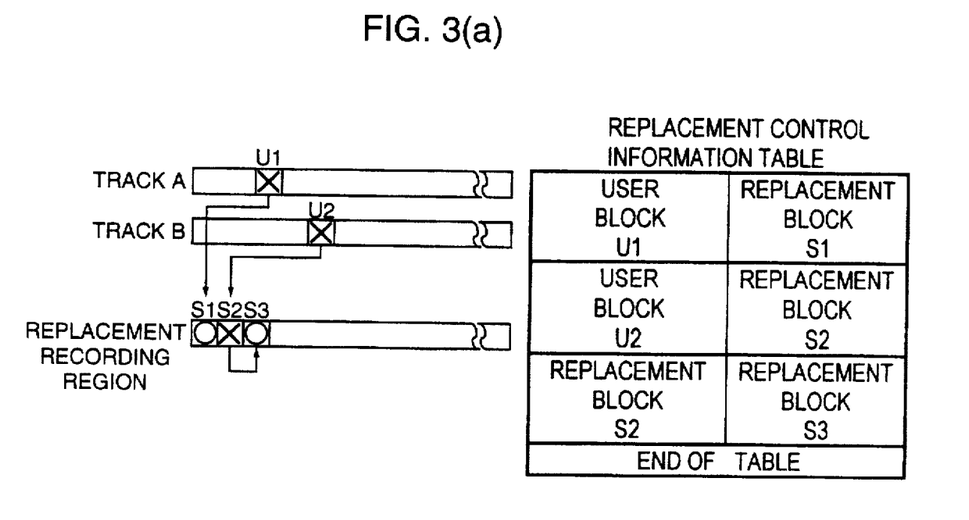
FIGS. 3a and 3b are drawings explanatory of the data recording method as the embodiment of the invention.
Figure 3B:
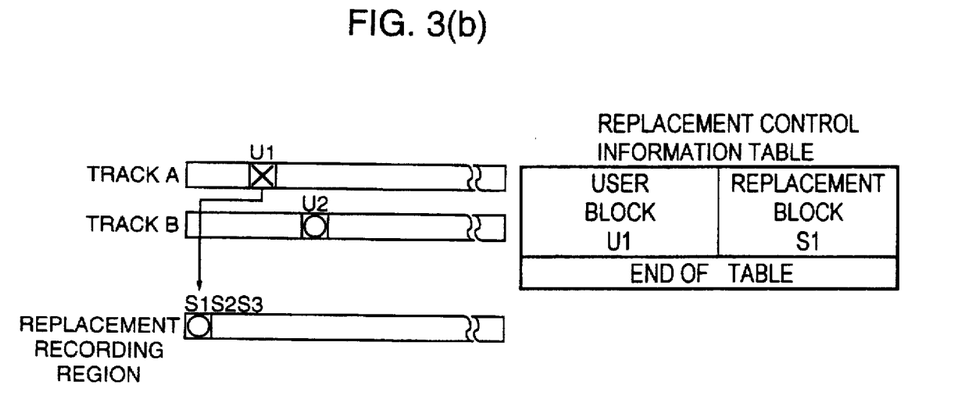

Further, when there is link information U1-S1 and U2-S2-S3 as shown in FIG. 3(a), if data is updated normally also for U2 in data updating on the track B, the link information U2-S2-S3 is deleted as shown in FIG. 3(b). Then, since there is no assigned replacement block following the blocks S2 and S3, the replacement control information table 41 and the replacement control information recording region 63 are updated with the link information U1-S1 set at the tail and the blocks S2 and S3 are left as unused regions.

Figure 4A:
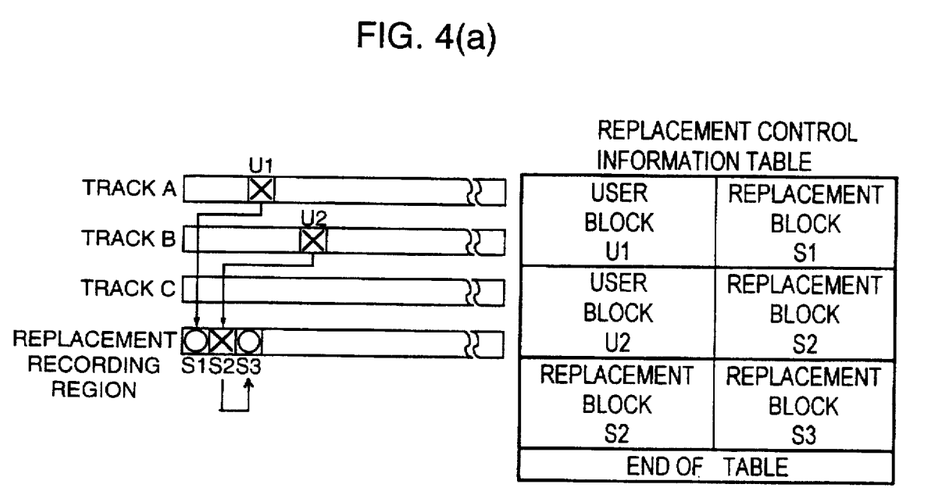
FIGS. 4a and 4b are drawings explanatory of the data recording method as the embodiment of the invention.
Figure 4B:
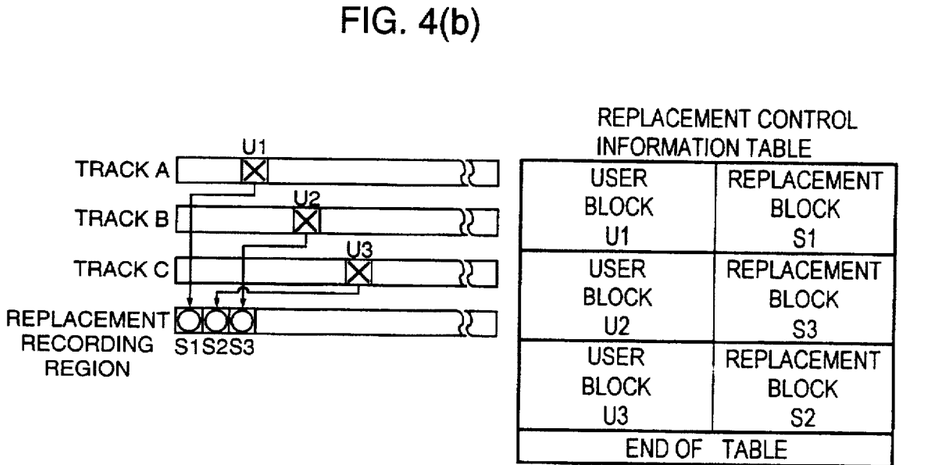

Now, in a state where there is present link information U1-S1 and U2-S2-S3 as shown in FIG. 4(a), if a defective user block U3 is newly generated as a result of data updating on the track C as shown in FIG. 4(b), then, the data to be written in the block U3 is written into the defective replacement block S2. When the recording is executed normally, S2 is removed from the link information U2-S2-S3 to change it into link information U2-S3 and new link information U3-S2 is generated and the replacement control information table 41 and the replacement control information recording region 63 are updated correspondingly.

Figure 5A:
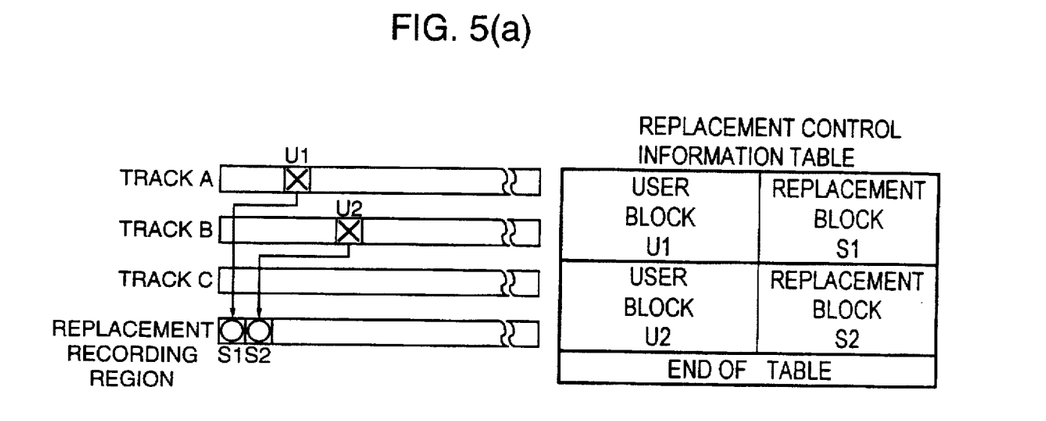
FIGS. 5a and 5b are drawings explanatory of the data recording method as the embodiment of the invention.
Figure 5B:
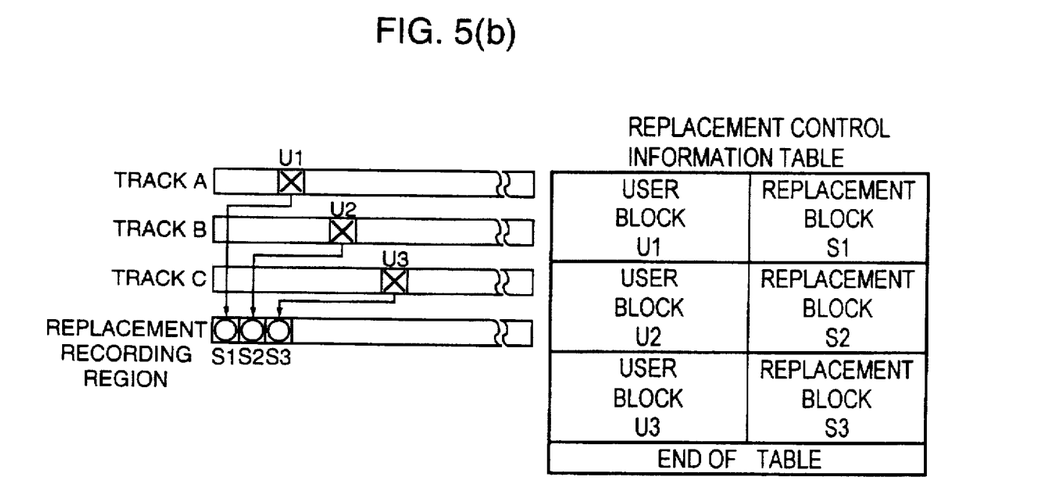

Further, in the state where there is link information U1-S1 and U2-S2 as shown in FIG. 5(a), if a defective user block U3 is newly generated as a result of data updating on the track C as shown in FIG. 5(b), then, since there is no defective replacement block, a block S3 which is at the head of unused replacement blocks is assigned as the replacement block for the block U3.

Figures 11, 11A:
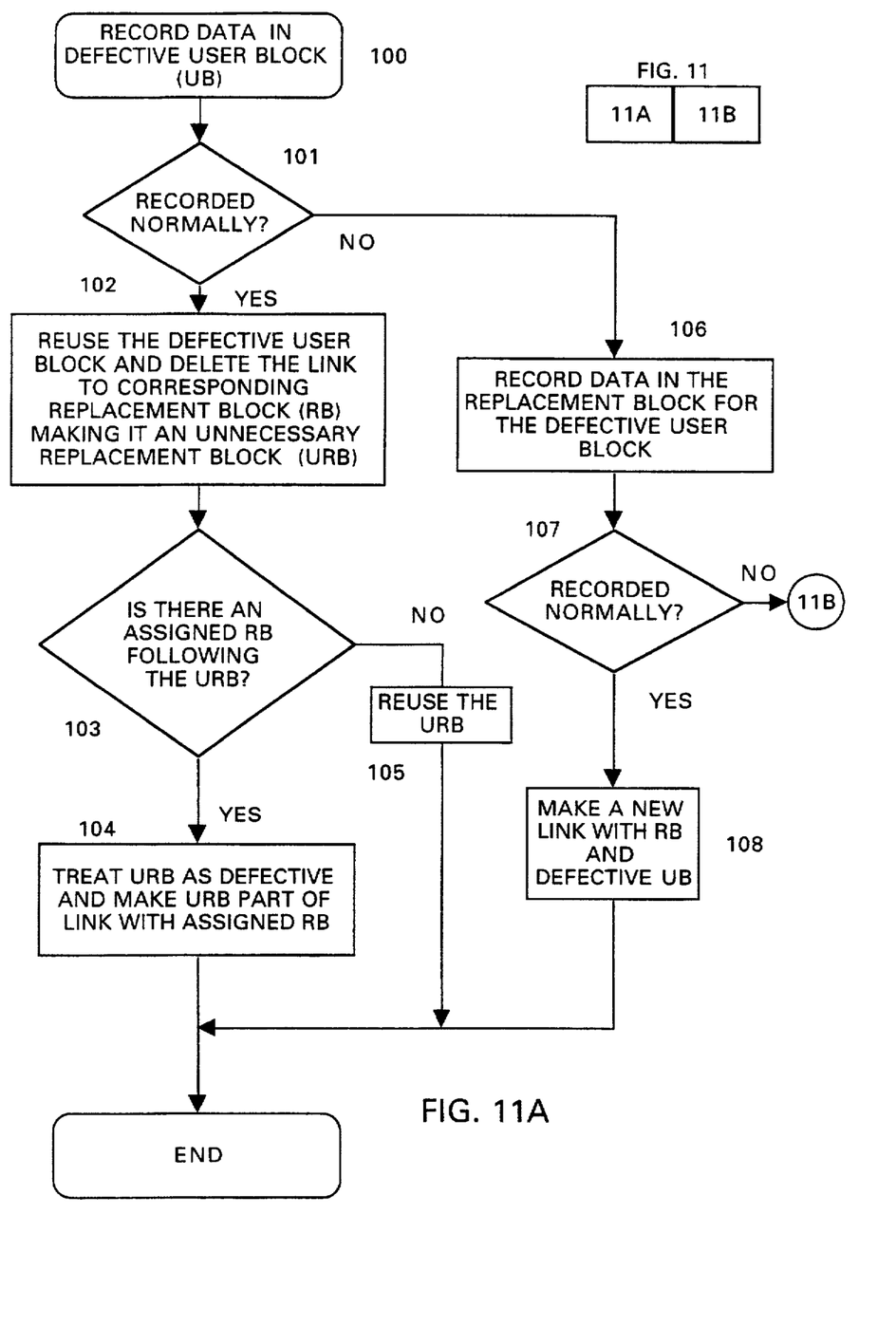
FIG. 11 is comprised of FIGS. 11A and 11B and shows a flow chart of the steps followed in controlling the recording of information on an optical disk according to a preferred embodiment of the invention using replacement recording blocks.
Figures 11, 11B:
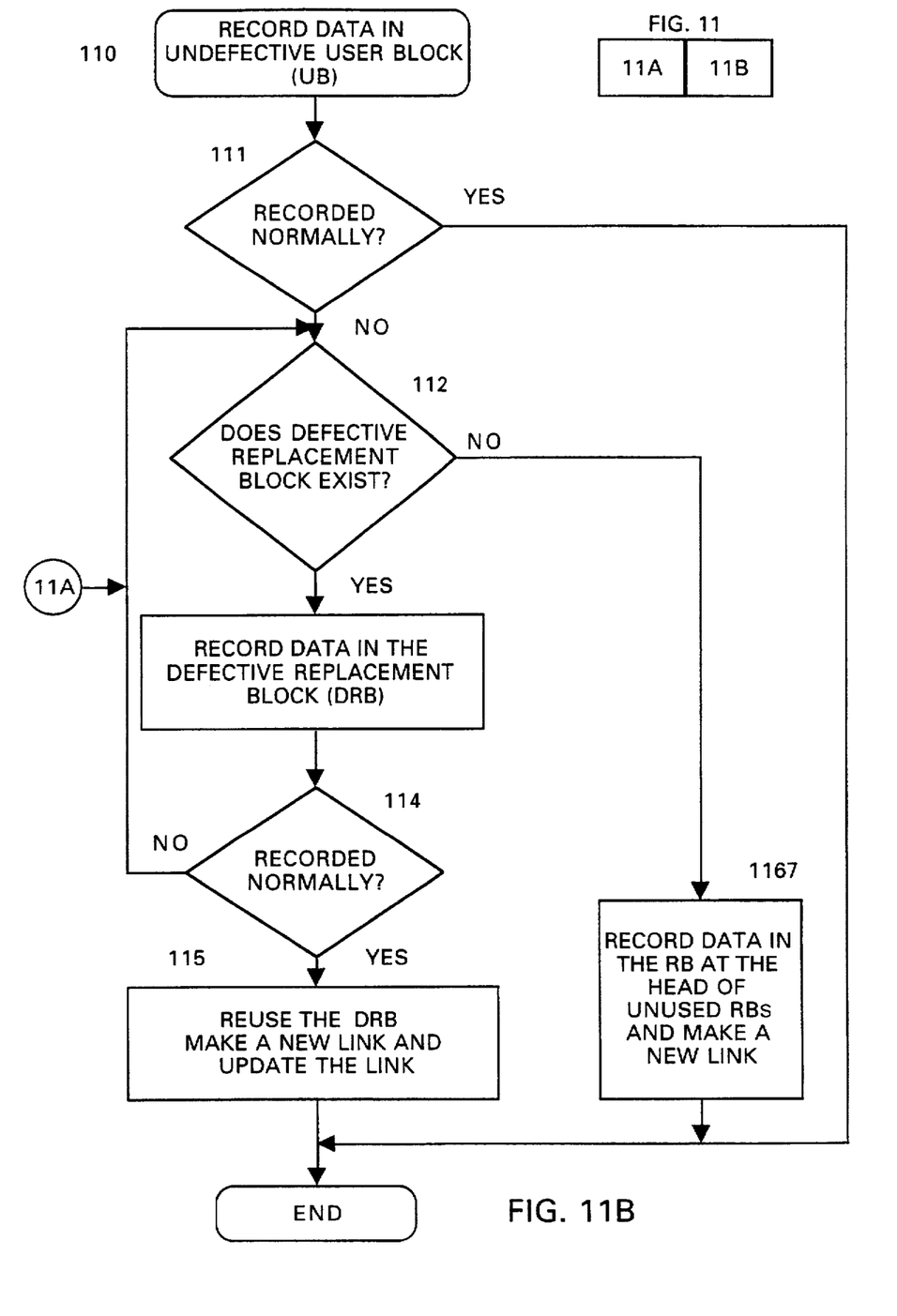

In general, the steps followed in recording data in user blocks is shown in FIG. 11, which includes FIGS. 11(a) and 11(b). In FIG. 11(a), the flow starts with recording data on a defective user block, abbreviated UB, in step 100. Then, in step 101 it is checked whether the data was recorded normally or not. If so, the defective user block is reused and the blink to the corresponding replacement block, abbreviated RB, is made an unnecessary replacement block (URB) in the step 102. Then, in step 103, the replacement block region is checked to determine if there is an assigned replacement block following the unassigned replacement block in step 103. For example, in the transition from the situation in FIG. 1(a) to FIG. 1(b), the user block U2 is checked to determine if it is defective when the data is updated on track B. Since the user block U2 is determined to be recorded normally during the data updating, the corresponding replacement block S2 is made unnecessary. However, an assigned replacement block S3 is found to follow unnecessary replacement block S2, as shown in FIG. 1(b), so unnecessary replacement block S2 is treated as a defective replacement block. When the unnecessary replacement block is treated as defective, it is made part of the link with the assigned replacement block that follows it in step 104, and the flow ends. On the other hand, if no assigned replacement block follows the unnecessary replacement block in 103, the unnecessary replacement block is reused the next time and from then on, in step 105.

Returning to step 101 in FIG. 11(a), if the defective user block on which the data is recorded is not recorded normally, then the data is recorded in the replacement block for the defective user block in step 106. The recording is checked in step 107 and if the data is recorded normally, then a new link is made with the replacement block on which the data is recorded in step 106 and the defective user block of step 100, in step 108.

On the other hand, if the data recorded in the replacement block in step 106 is not recorded normally as determined in step 107, then the flow proceeds to FIG. 11(b). In FIG. 11(b), the situation is considered in which data is recorded on an undefective user block in step 110 and it is checked in step 111 whether or not the data is recorded normally. If not, then the situation is the same as when data is not recorded normally in the replacement block for a defective user block in step 106, and thus the flow from FIG. 11(a) joins FIG. 11(b) to proceed with the determination of whether or not a defective replacement block exists in step 112. If a defective replacement block exists, then data is recorded in the defective replacement block in step 113 and it is determined if the recording is normal in step 114. If the recording is not normal, then the flow returns to the determination of step 112. On the other hand, if the recording is normal, then in step 115 the defective replacement block is reused, a new link is made and the link is updated in the replacement control information table.

Returning to step 112, if no defective replacement block exists, then the data is recorded in the replacement block at the head of the unused replacement blocks and a new link is made in step 116. The flow chart in FIGS. 11(a) and 11(b) describe generally the steps performed in following the macroinstructions 30 stored in control memory 4 and executed by microprocessor 22. FIGS. 1–5 show the specific examples of controlling the recording of records in a rewritable disk apparatus, according to the invention.

As described in the foregoing, in updating data, a block previously judged to be a defective user block is also subjected to the data updating and, if the block is judged to be a normal block as the result of the updating, it is made possible to treat the block as a normal block from that time on and, thus, it becomes possible to reuse the user block and the replacement block. Accordingly, as compared with the case where a defective block is not reused, a meritorious effect can be obtained that the total number of defective blocks can be reduced and also such effects can be obtained that the number of the replacement blocks in use in the replacement region can be reduced and the frequency of access to the replacement recording region can be decreased.

According to the present invention, the replacement recording region can be used continuously even when defective blocks are reused on an optical disk. Therefore, even with an optical disk in accordance with the standard of the medium of the second generation five-inch rewritable type optical disk, reuse of defective blocks becomes possible and such effects can be obtained that the total number of defective user blocks is decreased, the number of replacement blocks in use within the replacement recording region is decreased, and the frequency of access to the replacement recording region is decreased.

We claim:

1. A method of controlling recording of data on a rewritable information recording medium which has a recording area divided into a plurality of predetermined recording units and having, in said recording area, a user region for recording user data in normal user blocks, a replacement region for recording user data in a replacement block when it is determined that a defective user block exists in which data cannot be recorded normally, and a replacement control region having a table for registering address information of said defective user blocks and address information of a link between said defective user blocks and said replacement blocks, comprising the steps of:

storing address information of defective replacement blocks in the replacement control region and address information of said replacement blocks to which said defective replacement blocks are linked;

referring to said table when data is read from said medium so that one of said replacement blocks is read from said replacement region when a corresponding one of said defective user blocks is to be read;

reusing said defective user blocks when during recording of data in said user region, one of said defective user blocks is determined to be normal, including deleting the link information stored in said table between said one defective user block and said one replacement block and recognizing said one replacement block as an unnecessary replacement block thereafter; determining for said unnecessary replacement block if there is another replacement block, that has one link to another defective user block, following said unnecessary replacement block in said replacement region; and updating said table to include said unnecessary replacement block in said one link with said another replacement block when said another replacement block is determined to exist.

2. A method of controlling recording of data according to claim 1, further including updating said table to delete the address information of said unnecessary replacement block when said another replacement block is determined not to exist.

3. A method of controlling recording of data according to claim 1, further including treating said one unnecessary replacement block as a temporary defective replacement block in said updating of said table to include said unnecessary replacement block in said one link such that said another defective user block is linked to said temporary defective replacement block as one pair of address information stored in said table and said temporary defective replacement block is linked to said another replacement block as a second pair of address information registered in said table.

4. A method of controlling recording of data according to claim 3, wherein in the registering of address information of said defective user blocks and address information of a link for a second one of said defective user blocks, an end one of said replacement blocks is assigned to said next defective user block.

5. A method of controlling recording of data according to claim 3, wherein when it is determined that a next one of said defective user blocks exists during said recording, a next one of said replacement blocks is assigned an address information of said next defective user block and said next replacement block is stored in said table and wherein in said assigning of said next replacement block, it is determined if any of said replacement blocks is a temporary defective replacement block and if so, said temporary defective replacement block is assigned as said next replacement block.

6. A system for controlling recording of data on a rewritable information recording medium having a recording area divided into a plurality of predetermined recording units and having, in said recording area, a user region for recording user data in normal user blocks, a replacement region for recording user data in a replacement block when it is determined during recording that a defective user block exists in which data cannot be recorded normally, comprising: means for storing a table registering address information of said defective user blocks and address information of a link between said defective user blocks and said replacement blocks, said storing means storing address information of defective replacement blocks in the replacement region and address information of said replacement blocks to which said defective replacement blocks are linked;

control means for reading from said medium that refers to said table so that one of said replacement blocks is read from said replacement region when a corresponding one of said defective user blocks is to be read, said control means controlling reuse of said defective user blocks when, during recording of data in said user region, one of said defective user blocks is determined to be normal, including means for deleting the link information stored in said table between said one defective user block and said one replacement block and recognizing said one replacement block as an unnecessary replacement block thereafter;

means for determining whether said unnecessary replacement block is followed by another replacement block that is linked to another defective user block; and means for updating said table to include said unnecessary replacement block in a link with said another replacement block when said another replacement block is determined to exist.

7. A system for controlling recording of data according to claim 6, further including means for updating said table to delete the address information of said unnecessary replacement block when said another replacement block is determined not to exist.

8. A system for controlling recording of data according to claim 6, further including means for treating said one unnecessary replacement block as a temporary defective replacement block when said updating means updates said table to include said unnecessary replacement block such that said another defective user block is linked to said temporary defective replacement block as one pair of address information stored in said table and said temporary defective replacement block is linked to said another replacement block as a second pair of address information registered in said table.

9. A system of controlling recording of data according to claim 8, wherein said control means assigns an end one of said replacement blocks as said next defective user block in said replacement control region when a next user block is determined to be defective.

10. A system for controlling recording of information according to claim 8, including means for assigning a next one of said replacement blocks for a next one of said defective user blocks and storing address information of said next defective user block and said next replacement block in said table, and means for determining if any of said replacement blocks is a temporary defective replacement block, and if so, assigning said temporary defective replacement block as said next replacement block.

11. An optical disk controller for controlling recording of data on an optical disk having a user region for recording user data in normal user blocks, a replacement region for recording user data in a replacement block when it is determined that a defective user block exists in which data cannot be recorded normally, and a replacement control region for registering address information in a table of said defective user blocks and address information of a link between said defective user blocks and said replacement blocks, comprising:

- means for storing address information of defective replacement blocks in the replacement control region and address information of said replacement blocks to which said defective replacement blocks are linked;
- means for reading from said optical disk one of said replacement blocks from said replacement region of a corresponding one of said defective user blocks;
- means for reusing said defective user blocks when data is normally recorded in a once defective user block, including deleting the link information stored in said table between said once defective user block and said one replacement block and recognizing said one replacement block as an unnecessary replacement block;
- means for determining if another said replacement block, that is linked to another of said defective user blocks, follows said unnecessary replacement block; and means for updating said table to include said unnecessary replacement block in said link with said another replacement block when said another replacement block is determined to exist.

12. An optical disk controller for controlling recording of data according to claim 11, further including means for updating said table to delete the address information from said unnecessary replacement block when said another replacement block is determined not to exist.

13. An optical disk controller according to claim 11, wherein said optical disk is a second generation five-inch rewritable-type optical disk.

14. An optical disk controller according to claim 11, further including means treating said one unnecessary replacement block as a temporary defective replacement block.

15. An optical disk controller according to claim 14, further including means for assigning an end one of said replacement blocks in said replacement control region to a next one of said defective user blocks and registering address information corresponding to said next defective user block and said end one of said replacement blocks in said table.

16. An optical disk controller according to claim 14, further including means for assigning a next one of said replacement blocks to a next one of said defective user blocks unless it is determined that one of said replacement blocks is a temporary defective replacement block, and if so, using said temporary defective replacement block as said next replacement block.

* * * * *